United States Patent Office 3,487,789
Patented Jan. 6, 1970

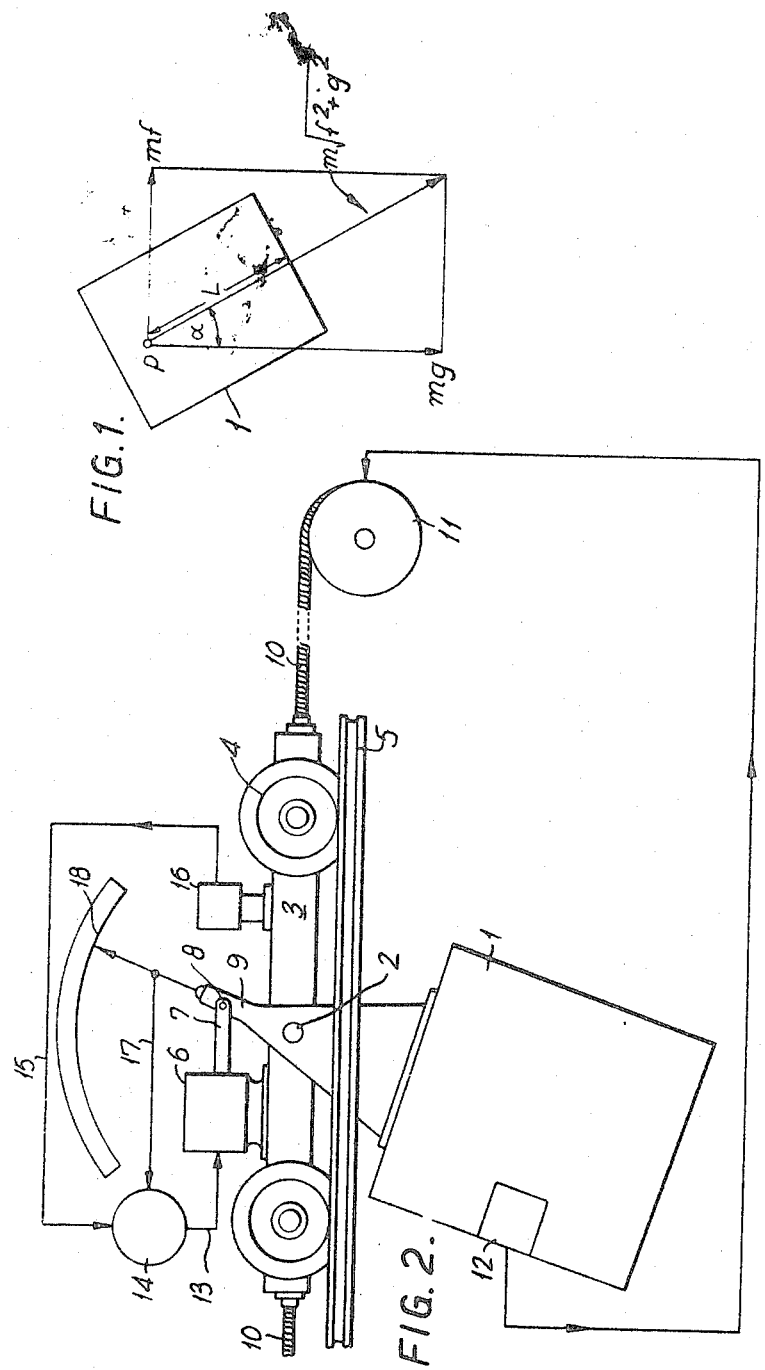

3,487,789
DAMPENED AERIAL CAR SUSPENDED TRANSPORTATION SYSTEM
Kenneth Charles Garner, Cranfield, England, assignor to National Research Development Corporation, London, England, a British corporation
Filed Jan. 9, 1968, Ser. No. 696,596
Int. Cl. B61b *5/02;* B61c *13/04;* E01b *25/22*
U.S. Cl. 105—149                    10 Claims

ABSTRACT OF THE DISCLOSURE

A transport system primarily for passengers, comprising a vehicle arranged for travel along a fixed path, in which means are provided to tilt passengers forwards and backwards in the direction of movement of the vehicle, to counter-balance horizontal accelerations and decelerations of the vehicle in that direction. Correlation between the degree of tilting and the horizontal accelerations and decelerations is achieved by signals from transducers sensing the angle of tilt and the accelerations, which via a comparator are arranged to control either the tilting or propelling/braking means for the vehicle so as to match one with the other.

---

Figure 3:
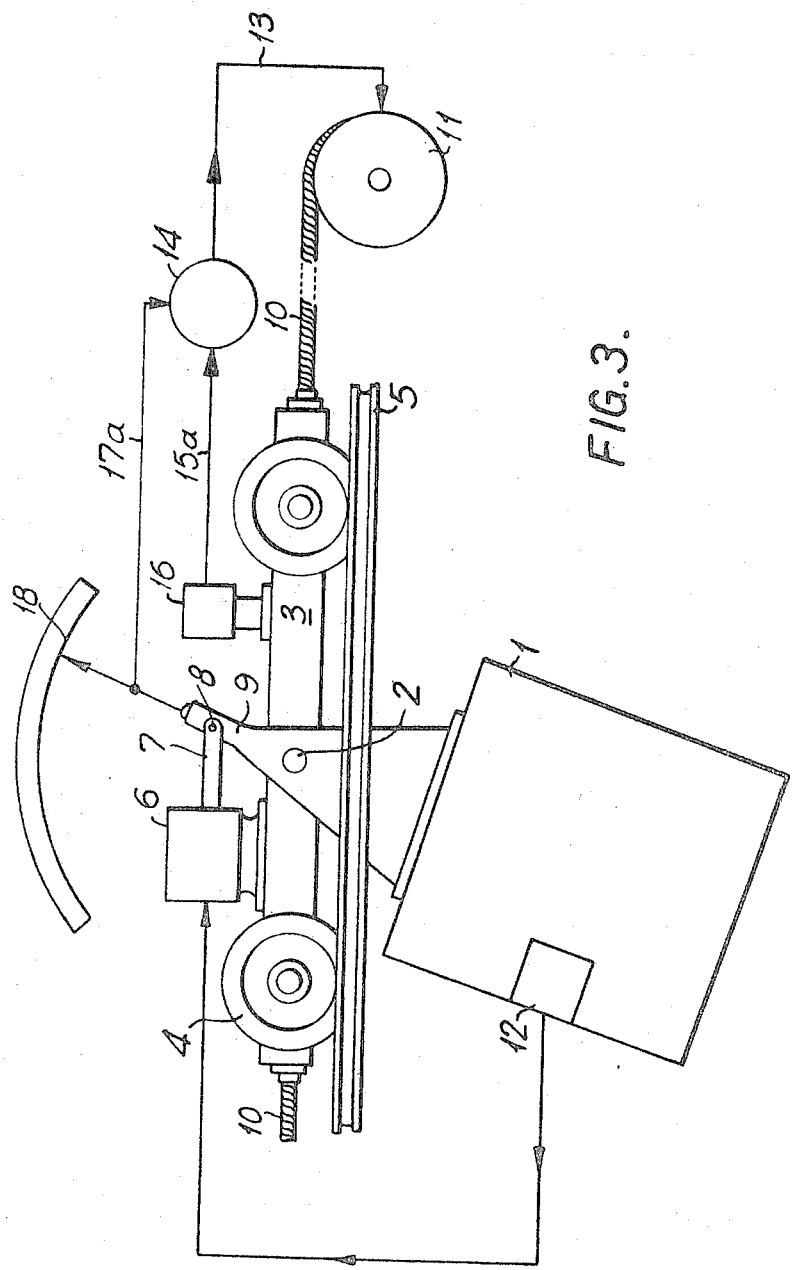

This invention relates to a transport system. While the system has primarily been developed and will hereinafter be described in relation to a passenger transport system, it is to be understood that it may be arranged to handle any form of load.

With the increasing size of office and factory buildings, industrial plants and passenger handling areas at airports, railway termini, docks and shopping precincts, etc. there exists a requirement for the rapid transportation of passengers from one point to another with minimum delay.

For various reasons, among which are economy, passenger accessibility, and the need for high capacity, it is desirable that passengers should stand while being transported. This, however, raises the difficulty that in providing for the relatively high accelerations or decelerations necessary for an effective transport system, the main object of which is to save time, passengers will at best be subjected to discomfort if they are not unbalanced or toppled.

It is the object of this invention to provide a transport system which overcomes this difficulty or at least reduces discomfort to passengers to reasonable proportions.

According to this invention a transport system comprises in combination a vehicle arranged for travel along a predetermined path, means to propel the vehicle along the path, the vehicle including a load-supporting surface, means mounting at least the said surface for tilting movement with respect to the horizontal about an axis transverse to the direction of the path, means to effect the said tilting movement, and means to correlate the degree of tilt and horizontal components of acceleration or deceleration of the vehicle so that loads on the said surface are subjected to substantially no net toppling moments by the said horizontal components of acceleration or deceleration in the direction of the path.

The correlating means can basically be arranged to operate in two alternative ways.

In a first arrangement provision is made to operate the propelling means in a predetermined manner, and the correlating means are arranged to control the operation of the tilting means so that toppling moments to which loads will be subjected by the said components of acceleration or deceleration are counterbalanced by tilting of the said surface.

In a second arrangement provision is made to operate the tilting means in a predetermined manner, and the correlating means are arranged to control the propelling means so that toppling moments to which loads will be subjected by the tilting of the said surface are counter-balanced by the horizontal components of acceleration or deceleration of the vehicle.

In each case the correlating means essentially comprise means to sense and produce a signal representing (a) horizontal acceleration or decelerations of the vehicle in the direction of the path and (b) the degree of tilt of the load supporting surface, and means to compare these signals and produce a difference signal to control operation of the tilting means or the propelling means as the case may be.

The invention is further described below with reference to the accompanying drawings in which:

FIGURE 1 is a diagram indicating the forces which have to be taken into account to achieve the object of the invention, FIGURE 2 is a diagrammatic elevational view of a transport system in accordance with one embodiment of the invention, and FIGURE 3 is a view similar to FIGURE 2 of an alternative embodiment.

Referring to FIGURE 1, a vehicle indicated at 1 is assumed to be arranged for travel along a predetermined path and for tilting movement with respect to the horizontal about an axis transverse to the direction of travel. The angle at which in any given case it is necessary to tilt the vehicle so that toppling moments to which passengers or loads within the vehicle will be subjected by horizontal components of acceleration or deceleration in the direction of movement may be counter-balanced is indicated at $\alpha$. Essentially, of course, in the case of a passenger standing on the floor of the vehicle it is necessary to tilt the same so that the vertical component of the passenger's weight produces a moment about his feet of the magnitude but of opposite sense to the horizontal components of acceleration or deceleration. It will readily be seen that the correct angle $\alpha$ through which the vehicle should be tilted has a tangent value which is proportional to the ratio of the propelling or braking acceleration or deceleration, and the gravitational acceleration. Thus, assuming a passenger or an inanimate object within the vehicle has a mass $m$ having a centre of gravity at a point P which is at a perpendicular distance L from the floor of the vehicle, and the vehicle is experiencing a horizontal acceleration or deceleration of magnitude $f$ and gravitational acceleration $g$ acts on the mass $m$ along the local vertical, then the moment acting on the passenger due to the inclination of the vehicle floor will be $mg \sin \alpha L$ and the moment acting on the passenger due to horizontal acceleration of the vehicle will be $mfL \cos \alpha$. In order not to unbalance the passenger these moments must of course be equalised so that $$mgL \sin \alpha = mfL \cos \alpha$$

leading to the requirement that for no unbalance the angle of tilt $$\alpha = \arctan f/g$$

Naturally the effects of acceleration or deceleration cannot be entirely hidden from a passenger, but it can be arranged that the passenger will be subjected to no more discomfort or sensation of movement than in a high speed lift. That is to say, the passenger will merely experience a change in his apparent weight, which at the correct angle of tilt for the horizontal acceleration is given by the expression:

$$\text{Apparent excess weight} = m[\sqrt{f^2+g^2}-g]$$

This change in weight will always be an increase because whatever the sign of the quantity $f$ (i.e. whether it represents an acceleration or a deceleration), its square, i.e. $f^2$ is always a positive quantity. Thus, under both accelerating and decelerating conditions the passenger will experience only an apparent increase in weight, and never a decrease. Because there will be an apparent increase in weight, however, it is reasonable to consider this to be a limiting factor on the acceleration and deceleration of a vehicle in a transport system in accordance with this invention. What this liimit may be depends on the acceleration tolerance of the passenger. It is expected that in the interests of economy and efficiency that industrial and military users could be submitted to greater accelerations than private citizens. However, merely as an example, to give an indication of the facility that could be provided by the present transport system, assuming the passenger's tolerance would allow an apparent increase in weight of 25 percent, it is easy to show from the preceding relationships that a maximum acceleration of 0.75$g$, or 24 ft./sec. is allowable. Under these conditions the load-supporting surface of the vehicle would require to be inclined at an angle of approximately 35° to the horizontal. Such a performance would enable a passenger to be transported between stations 240 feet apart in little more than 3.5 seconds, and between stations 1200 feet apart a little more than 8 seconds; the latter case giving rise to a maximum speed of approximately 60 miles per hour.

Two ways in which it may be arranged to control tilting of a vehicle or at least a load-supporting surface thereof, to achieve the object of the invention, are indicated in FIGS. 2 and 3.

Referring first to FIG. 2, a vehicle 1 comprising a rectangular box structure is pivotally suspended at 2 from a chassis 3 mounted on wheels 4 to run on rails 5, for convenience only one pair of wheels and one rail being shown. In order to rotate the vehicle 1 about its pivot 2, the axis of which is of course transverse to that of the path provided by the rails 5, i.e. to tilt the floor of the vehicle with respect to the horizontal, an actuator 6 is mounted on the chassis 3, the actuator including a reciprocable arm 7 pivotally secured at 8 to an upward extension 9 of the bracket by which the vehicle 1 is suspended from the chassis. The running-gear is arranged in this case to be driven via cables 10 by an convenient form of prime mover, one of which is indicated at 11.

It is assumed that provision is made to operate the propelling or driving mechanism in a predetermined manner. That is to say, the mechanism will be set up so as, on receipt of an initiating signal, to accelerate the vehicle up to a selected speed at a rate not exceeding a predetermined maximum to suit the system and its requirements, and conversely to brake or decelerate the vehicle, when so signalled, at a rate not exceeding a predetermined maximum. In the arrangement illustrated it is intended that upon entering the vehicle 1 a passenger should operate a control indicated at 12 to set the driving mechanism in operation, and the actuator 6 is arranged to be operated to the appropriate extent in the appropriate sense by a signal 13 from a comparator device 14, the signal 13 being the difference between a signal 15 representing the desired position of the actuator 6, derived from an acceleratometer 16, and a signal 17 which represents the achieved position of the actuator and/or the degree of tilt of the vehicle, and is derived from a transducer 18.

Referring now to FIG. 3 an alternative arrangement is shown in which the components are the same as in FIG. 2, but are arranged to operate in a different manner. Like parts have been given the same reference numerals as in FIG. 2. The basic distinction between the arrangement of FIG. 3 and that of FIG. 2 is that whereas in the arrangement of FIG. 2 it is arranged to control the degree of tilt of the a vehicle by an acceleration measuring transducer, i.e. to match the degree of tilt to the rate of acceleration, in the arrangement of FIG. 3, it is the acceleration of the vehicle which is arranged to match the degree of tilt of the vehicle, the tilting means being arranged to operate in a predetermined manner. The same basic considerations apply to the predetermined manner of operation of the tilting means as to the predetermined manner of operation of the propelling means in the arrangement of FIG. 2. That is to say, the tilting means will be set up so as to effect tilting up to a maximum angle at a rate not exceeding a predetermined maximum first in one direction and then in the opposite direction.

Thus, as shown in FIG. 3, the control 12 in the vehicle to be operated by a passenger to initiate a journey is arranged directly to operate the actuator 6. The angle of tilt of the vehicle is measured by the transducer 18 which transmits a signal 17$a$ which can be interpreted as a demand for horizontal acceleration of the vehicle. This signal 17$a$ is compared with a signal 15A derived from the accelerometer 16 and which represents the achieved acceleration. As before these signals are fed to a comparator 14, the resulting difference signal 13 from which provides an acceleration control signal to cause the prime mover 11 to accelerate or decelerate the vehicle as required to match the existing angle of tilt of the vehicle with an appropriate horizontal acceleration.

It will be appreciated that the manner in which the required signals to initiate or terminate a journey of a vehicle are arranged to be given need not necessarily be as described in connection with FIGS. 2 and 3. Although it is thought that it would be most convenient for at least the initiating signal to be under the control of an intending passenger, clearly any form of external or remote control could be provided if desired. In the event of the system being arranged to effect transport between a series of fixed stages than the predetermined manner of operation of the propelling means and the tilting means, as the case may be, will have to be fully automated. That is to say, once a journey has been selected and initiated it will be arranged to progress in a predetermined manner to its termination. In other words, a passenger would merely operate a selector control as in a lift, and thereafter the system would operate automatically.

The precise form of the vehicle, the nature of the path, the manner in which the vehicle is arranged for travel therealong, and the means for driving the vehicle, are all matters of choice, as also is the manner in which the vehicle or appropriate parts only thereof are mounted for tilting movement about an axis transverse to the direction of the path.

It will be seen that although it makes for simplicity for the whole vehicle or passenger-carrying unit or compartment which it may comprise to be tilted, so as to tilt its floor as required, this is not essential. It could, for example, solely be arranged to tilt the floor or other load-supporting surfaces, including seats provided within the vehicle or compartment, it in principle only being necessary to tilt the passengers or loads. Alternatively, it might be arranged to effect the required tilting of the passengers or loads by an arrangement which both tilted a vehicle as a whole and a load-supporting surface therein.

As an additional feature of the invention it may be arranged to create for passengers within the vehicle, illusions of perspective or movement calculated to cause them to lean with respect to the vertical to assist in tilting them as required.

For example, it may be arranged to move one or more walls of the vehicle or passenger compartment in relation to each other or the floor, in a relationship with horizontal components of acceleration or deceleration of the vehicle, so as to create the illusion desired. Alternatively, or in addition, the illusion might be created by visual displays. This is possible because in man sight plays a predominant part in his ability to orientate himself.

While, as already indicated, the manner in which a vehicle, passenger-carrying compartment, or a part thereof may be mounted for the required tilting movement it is a matter of choice, it is thought it will be found advantageous to suspend the vehicle from running gear in a pendulous manner, as indicated in FIGS. 2 and 3, since when this is done the vehicle will tend to take up an inclination to the vertical, proportional to the vehicle's acceleration in the horizontal direction, i.e. to a degree, the required tilting of the vehicle or part thereof may be arranged to be obtained automatically and so reduce the power requirements of the tilting means.

As to the form which a vehicle may take, it is thought that a particularly useful form will be that of a lift compartment. Furthermore, the same form of retracting doors as in lifts may be provided for passenger access and, indeed, the same type of hauling equipment and control system as in a modern express lift may be used. In other words, already developed transport systems may be utilised in putting the system in accordance with this invention into effect.

It will be apparent that instead of arranging for a vehicle or a carriage or other running gear from or on which it may be suspended or otherwise mounted, to run on wheels engaging with a track, air bearings or other form of fluid cushion or running or sliding gear, may be employed. Equally for driving the vehicle any conventional traction or propelling means may be used, including for example linear electrical motors or aerodynamic reaction jets.

Finally, while the system has only been described in terms of catering for horizontal accelerations or decelerations of a vehicle in the direction of a path along which it is arranged to travel, plainly the system may be arranged to cater for horizontal accelerations in a direction normal to the track. Accordingly, the vehicle, or at least a load-supporting surface thereof, could be mounted for tilting movement with respect to the horizontal about an axis parallel to the direction of the path and means provided to effect and correlate the degree of tilt and the horizontal components of acceleration so that loads on the support surface are subjected to substantially no net toppling moments by horizontal components of acceleration or deceleration at right angles to the path.

I claim:

1. A transport system comprising in combination a vehicle arranged for travel along a predetermined path, means to propel the vehicle along the path, the vehicle including a load-supporting surface, means mounting at least the said surface for tilting movement with respect to the horizontal about an axis transverse to the direction of the path, means to effect the said tiling movement, and means to correlate the degree of tilt and horizontal components of acceleration or deceleration of the vehicle so that loads on the said surface are subjected to substantially no net toppling moments by the said horizontal component of acceleration of deceleration in the direction of the path.

2. A tranport system as claimed in claim 1 in which provision is made to operate the propelling means in a predetermined manner, and the correlating means are arranged to control the operation of the tilting means so that toppling moments to which loads will be subjected by the said components of acceleration or deceleration are counter balanced by tilting of the said surface.

3. A transport system as claimed in claim 2 in which the correlating means comprise means to sense horizontal accelerations or decelerations of the vehicle in the direction of the path and to produce a signal representing the required degree of tilt of the said load-supporting surface, means to monitor the degree of tilt thereof and to produce a signal representing the same, means to compare the said signals and to preduce a difference signal which is arranged to control operation of the tilting means.

4. A transport system as claimed in claim 1 in which provision is made to operate the tilting means in a predetermined manner, and the correlating means are arranged to control the propelling means so that toppling moments to which loads will be subjected by the tilting of the said surface are counter balanced by the horizontal components of acceleration or deceleration of the vehicle.

5. A transport system as claimed in claim 4 in which the correlating means comprise means to monitor the degree of tilt of the said load-supporting surface and to produce a signal representing the same, means to sense horizontal accelerations or decelerations of the vehicle in the direction of the path and to produce a signal representing the same, and means to compare the said signals and to produce a difference signal which is arranged to control operation of the said propelling means.

6. A transport system as claimed in claim 1 in which the vehicle comprises a compartment mounted for the said tilting movement as a whole to enable its floor which serves as a load-supporting surface to be tilted.

7. A transport system as claimed in claim 6, in which the compartment is suspended from running gear such that its effective centre of gravity is below the axis about which it is arranged to tilt.

8. A transport system as claimed in claim 1 in which provision is made to create for passengers within the vehicle illusions of perspective or movement calculated to cause them to lean with respect to the vertical to assist in tilting them as required.

9. A transport system as claimed in claim 8 in which the illusion is created by arranging to move one or more walls of the vehicle in relation to its floor.

10. A transport system as claimed in claim 1 comprising means mounting at least the said surface for tilting movement with respect to the horizontal about an axis parallel to the direction of the path, means to effect this said tilting movement and means to correlate the degree of this tilting movement and horizontal components of acceleration and deceleration of the vehicle in a direction transverse to that of the path so that loads on the said surface are subjected to substantially no net toppling moments by those components.

References Cited

UNITED STATES PATENTS

| 3,106,171 | 10/1963 | Julien | 105—164 XR |
| 3,353,503 | 11/1967 | Pettit | 105—150 |

FOREIGN PATENTS 17,115    5/1900    Great Britain.

ARTHUR L. LA POINT, Primary Examiner

H. BELTRAN, Assistant Examiner

U.S. Cl. X.R.

104—94, 183; 105—155, 164